(12) United States Patent
Minemoto

(10) Patent No.: US 6,973,642 B2
(45) Date of Patent: Dec. 6, 2005

(54) MULTI-DIMENSIONAL PROGRAMMING DEVICE AND MULTI-DIMENSIONAL PROGRAMMING METHOD

(76) Inventor: Masateru Minemoto, Tanaka Mansion 203, 4-10-11 Ohmorinishi Ohta-ku, Tokyo (JP)

(*) Notice: Subject to any disclaimer, the term of this patent is extended or adjusted under 35 U.S.C. 154(b) by 652 days.

(21) Appl. No.: 10/032,816

(22) Filed: Dec. 26, 2001

(65) Prior Publication Data

US 2003/0074631 A1   Apr. 17, 2003

(30) Foreign Application Priority Data

Oct. 12, 2001 (JP) .............................. 2001-315109

(51) Int. Cl.⁷ .............................................. G06F 9/44
(52) U.S. Cl. ...................... 717/109; 717/105; 717/113
(58) Field of Search ............................... 717/104, 105, 717/113, 156, 109; 345/418–428; 707/1, 707/101, 103 R, 102; 715/501.1, 502, 503; 711/203

(56) References Cited

U.S. PATENT DOCUMENTS

| | | | | |
|---|---|---|---|---|
| 5,034,899 A | * | 7/1991 | Schult | 345/441 |
| 5,301,284 A | * | 4/1994 | Estes et al. | 711/203 |
| 5,359,724 A | * | 10/1994 | Earle | 707/205 |
| 5,604,854 A | * | 2/1997 | Glassey | 715/503 |
| 5,845,270 A | * | 12/1998 | Schatz et al. | 706/11 |
| 5,847,711 A | * | 12/1998 | Kaufman et al. | 345/424 |
| 6,108,657 A | * | 8/2000 | Shoup et al. | 707/100 |
| 6,182,060 B1 | * | 1/2001 | Hedgcock et al. | 707/1 |
| 6,317,750 B1 | * | 11/2001 | Tortolani et al. | 707/103 R |
| 6,460,026 B1 | * | 10/2002 | Pasumansky | 707/1 |
| 6,496,832 B2 | * | 12/2002 | Chi et al. | 707/102 |
| 6,542,895 B1 | * | 4/2003 | DeKimpe et al. | 707/101 |
| 6,628,312 B1 | * | 9/2003 | Rao et al. | 715/853 |

OTHER PUBLICATIONS

Jarke J. van Wijk, Robert van Liere, "HyperSlice, Visualization of scalar f unctions of many variables", 1993, In Proceedings of IEEE Visualization '93.*

Kostas Anagnostou, Tim J. Atherton, Andrew E. Waterfall, 4D Volume Rendering With The Shear Warp Factorisation, 2000, ACM Press.*

(Continued)

Primary Examiner—Kakali Chaki
Assistant Examiner—Trenton J. Roche
(74) Attorney, Agent, or Firm—Kramer Levin Naftalis & Frankel LLP

(57) ABSTRACT

An object is to provide a multi-dimensional programming device and a multi-dimensional programming method for creating multi-dimensional, horizontally written flowcharts, which solves problems experienced in vertically written program flowcharts or the like, and also, drastically changes the programming technique. A central processing unit reads an object MD (i.e., object information) from an object MD file (i.e., an object file unit) in which object information for making multi-dimensional horizontally written flowcharts such as a two-dimensional flowchart, a three-dimensional flowchart and a four-dimensional flowchart is stored. Next, the central processing unit uses the object information to edit the multi-dimensional flowchart according to input instructions from a programmer. Then the multi-dimensional horizontally written flowchart is drafted based on the edited multi-dimensional flowchart and is displayed on a display device. Meanwhile, the central processing unit saves the edited multi-dimensional flowchart into an object file unit.

20 Claims, 18 Drawing Sheets

OTHER PUBLICATIONS

Viehstaedt, G., Minas, Mark, "DiaGen: A generator for diagram editors based on a hypergraph model", 1995, 2nd International Workshop on Next Generation Information Technologies and Systems.*

C. Bajaj, V. Pascucci, G. Rabbiolo, D. R. Schikore, "Hypervolume Visualization: A Challenge in Simplicity", 1998, IEEE Symposium on Volume Visualization, ACM SIGGRAPH, 1998, pp. 95-102.*

A. Michael Noll, A Computer Technique for Displaying n-Dimensional Hyperobjects:, 1967, Communications of the ACM archive, vol. 10, Issue 8 (Aug. 1967), pp.: 469-473.*

Edward J. Wegman, "The Grand Tour in k-Dimensions", Feb. 1991, Computing Science and Statistics: Proceedings of the 22nd Symposium on the Interface, (1991) 127-136.*

Praveen K. Murthy, Edward A. Lee, "A Generalization of Multidimensional Synchronous Dataflow to Handle Arbitrary Sampling Lattices", UCB Tech. Memorandum UCB/ERL M95/59, Mar. 20, 1995.*

James N. Haag, Michael A. Kelley, Paul F. Sherman, "TWO-D: The USF Beginner's Two-Dimensional Programming System", 1972.*

"Three Dimensional Software Modeling" Gil et al., Proceedings of the 20th International Conference on Software Engineering, 1998, pp. 105-114.

"Integrierte EVU-Informationssyseme" Ove, Elektrotechnik und Informationstechnik, Springer Verlage, Wiens, AT, vol. 110, No. 10, Jan. 1993, pp. 556-563.

* cited by examiner

Fig.6

| DERIVATIVE CLASS NAMES | BASIC CLASS NAMES |
|---|---|
| ACCESS TYPE 1  TYPE 1  EXTERNAL VARIABLE 1 | ACCESS TYPE A  TYPE A  MEMBER FUNCTION 1 (TYPE a  ARGUMENT a) |
| ACCESS TYPE 2  TYPE 2  EXTERNAL VARIABLE 2 | ACCESS TYPE B  TYPE B  MEMBER FUNCTION 1 (TYPE b  ARGUMENT b) |
| ACCESS TYPE 3  TYPE 3  EXTERNAL VARIABLE 3 | ACCESS TYPE C  TYPE C  MEMBER FUNCTION 1 (TYPE c  ARGUMENT c) |
| ACCESS TYPE 4  TYPE 4  EXTERNAL VARIABLE 4 | ACCESS TYPE D  TYPE D  MEMBER FUNCTION 1 (TYPE d  ARGUMENT d) |
| . . . | . . . . . |
| . . . | . . . . . |
| . . . | . . . . . |

Fig.7

| TYPE C  MEMBER FUNCTION 3 | | | | | |
|---|---|---|---|---|---|
| | | | | | |
| | | | | | |
| TYPE 1  EXTERNAL VARIABLE NAME 1 | | | | | |
| TYPE 2  EXTERNAL VARIABLE NAME 2 | | | | | |
| TYPE 3  EXTERNAL VARIABLE NAME 3 | | | | | |
| TYPE 4  EXTERNAL VARIABLE NAME 4 | | | | | |
| . . | | | | | |
| . . | | | | | |
| . . | | | | | |
| TYPE c  ARGUMENT c | | | | | |
| . . | | | | | |
| . . | | | | | |
| . . | | | | | |
| TYPE t  INTERNAL VARIABLE t | | | | | |
| . . | | | | | |
| . . | | | | | |
| . . | | | | | |

Fig.9

|  | TIME 1 | TIME 2 | TIME 3 | TIME 4 | TIME 5 | TIME 6 | TIME 7 | | | |
|---|---|---|---|---|---|---|---|---|---|---|
| PC 1 | ▓ | ▓ | ▓ | ▓ | ▓ | ▓ | | | | |
| PC 2 | | | ▓ | | | | | | | |
| PC 3 | | | ▓ | | | | | | | |
| PC 4 | | | ▓ | | | | | | | |
| CONDITION 1 | ▓ | ▓ | | ▓ | ▓ | ▓ | ▓ | | | |
| CONDITION 2 | | | ▓ | | | | | | | |
| CONDITION 3 | | | ▓ | | | | | | | |
| CONDITION 4 | | | ▓ | | | | | | | |
| EVENT 1 | ▓ | ▓ | ▓ | | ▓ | ▓ | | | | |
| EVENT 2 | | | ▓ | | | | | | | |
| EVENT 3 | | | ▓ | | | | | | | |
| EVENT 4 | | | ▓ | | | | | | | |
| EVENT 5 | | | ▓ | | | | | | | |
| CPU 1 | ▓ | ▓ | ▓ | ▓ | ▓ | ▓ | | | | |
| CPU 2 | | | ▓ | | | | | | | |
| CPU 3 | | | ▓ | | | | | | | |
| CONTROL 1 | ▓ | ▓ | ▓ | | ▓ | ▓ | | | | |
| CONTROL 2 | | | ▓ | | | | | | | |
| CONTROL 3 | | | ▓ | | | | | CONTROL 3 | CONTROL 2 | CONTROL 1 |
| DATA 1 | ▓ | ▓ | | ▓ | ▓ | ▓ | | | | ▓ |
| DATA 2 | | | ▓ | | | | | | | |
| DATA 3 | | | ▓ | | | | | | | |
| DATA 4 | | | ▓ | | | | | | | |
| DATA 5 | | | ▓ | | | | | | | |

Fig.15
|  | EVENT 1 | EVENT 2 | EVENT 3 | EVENT 4 | EVENT 5 |
|---|---|---|---|---|---|
| STATE 1 |  |  |  |  |  |
| STATE 2 |  |  |  |  |  |
| STATE 3 |  |  |  |  |  |
Fig.16
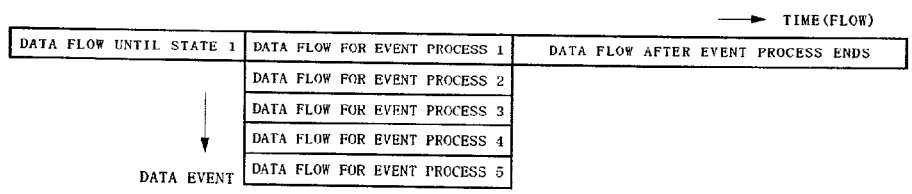
Fig.17
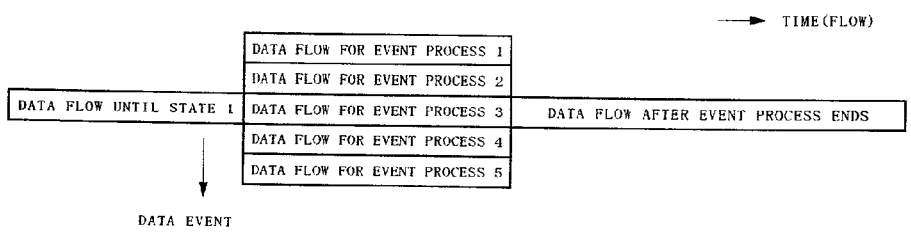

Fig.24

|  | TIME 1 | TIME 2 | TIME 3 | TIME 4 | TIME 5 | TIME 6 | TIME 7 | TIME 8 | TIME 9 | TIME 10 |
|---|---|---|---|---|---|---|---|---|---|---|
| CONTROL 1 | | | | | | | | | | |
| CONTROL 2 | | | | | | | | | | |
| CONTROL 3 | | | | | PROCESS FOR EVENT 3 | | | | | |
| CONTROL 4 | | | | | | | | | | |
| CONTROL 5 | | | | | | | | | | |
| CONTROL 6 | | | | | PROCESS FOR EVENT 1 | | | | | |
| CONTROL 7 | | | | | | | | | | |
| CONTROL 8 | | | | | | | | | | |
| CONTROL 9 | | | | | PROCESS FOR EVENT 1 | | | | | |
| CONTROL 10 | | | | | | | | | | |
| CONTROL 11 | | | | | | | | | | |
| CONTROL 12 | | | | | | | | | | |

Fig.25

| | TIME 1 | TIME 2 | TIME 3 | TIME 4 | TIME 5 | TIME 6 | TIME 7 | TIME 8 | TIME 9 | TIME 10 |
|---|---|---|---|---|---|---|---|---|---|---|
| CONTROL 1 | | | | | | | | | | |
| CONTROL 2 | | | | | | | | | | |
| CONTROL 3 | | | | | PROCESS FOR EVENT 3 ||||| |
| CONTROL 6 | | | | | PROCESS FOR EVENT 1 ||||| |
| CONTROL 9 | | | | | PROCESS FOR EVENT 1 ||||| |
| CONTROL 12 | | | | | | | | | | |
| CONTROL 13 | | | | | | | | | | |
| CONTROL 14 | | | | | | | | | | |
| CONTROL 15 | | | | | | | | | | |
| CONTROL 16 | | | | | | | | | | |
| CONTROL 17 | | | | | | | | | | |
| CONTROL 18 | | | | | | | | | | |

Fig.28

|  |  | TIME 1 | TIME 2 | TIME 3 | TIME 4 | TIME 5 | TIME 6 | TIME 7 | TIME 8 |
|---|---|---|---|---|---|---|---|---|---|
| CPU 1 | | | | | | | | | |
| | CONTROL 1 | | | | | | | | |
| | DATA 1 | | | | | | | | |
| | DATA 2 | | | | | | | | |
| | CONTROL 2 | | | | | | | | |
| | DATA 1 | | | | | | | | |
| | DATA 2 | | | | | | | | |
| | CONTROL 3 | | | | | | | | |
| | DATA 1 | | | | | | | | |
| | DATA 2 | | | | | | | | |
| CPU 2 | | | | | | | | | |
| | CONTROL 1 | | | | | | | | |
| | DATA 1 | | | | | | | | |
| | DATA 2 | | | | | | | | |
| | CONTROL 2 | | | | | | | | |
| | DATA 1 | | | | | | | | |
| | DATA 2 | | | | | | | | |
| | CONTROL 3 | | | | | | | | |
| | DATA 1 | | | | | | | | |
| | DATA 2 | | | | | | | | |

Fig.29

|  | TIME 1 | TIME 2 | TIME 3 | TIME 4 | TIME 5 | TIME 6 | TIME 7 |
|---|---|---|---|---|---|---|---|
| CPU 1 | CPU1 | | | | | | |
| CPU 2 | | | | | | | |
| CPU 3 | | | | | | | |
| CPU 4 | | | | | | | |

Fig.30

|       | TIME 1 | TIME 2 | TIME 3 | TIME 4 | TIME 5 | TIME 6 | TIME 7 |
|-------|--------|--------|--------|--------|--------|--------|--------|
| CPU 1 |        |        |        |        |        |        |        |
| CPU 2 | CPU1   |        | CPU2   |        |        | CPU1   |        |
| CPU 3 |        |        |        |        |        |        |        |
| CPU 4 |        |        |        |        |        |        |        |

MULTI-DIMENSIONAL PROGRAMMING DEVICE AND MULTI-DIMENSIONAL PROGRAMMING METHOD

BACKGROUND OF THE INVENTION

1. Field of the Invention

The present invention relates to a multi-dimensional programming device and a multi-dimensional programming method for creating multi-dimensional flowcharts which are written horizontally, such as a two-dimensional flowchart, a three-dimensional flowchart, a four-dimensional flowchart and the like.

2. Description of the Related Art

Programming for using a computer for a particular objective is generally put together according to the following procedure. Namely, "Step 1 program flowchart→(convert)→source program"
"Step 2 source program→(compiler)→object program"
"Step 3 object program→(linker)→load program".

The program flowchart mentioned in Step 1 above is typically written vertically, from top to bottom and from left to right, as shown in FIG. 31.

In a case where the flowchart does not follow this flow pattern, arrows are written in to clarify the direction of the flow.

That is, the program flowchart shown in FIG. 31, which is seeking an average value H, indicates, for example on a display, that the flow of control on each data of a sum S, an input value D and a counter C are written one after the other in the vertical direction in a fashion so as to correspond to a time axis.

However, when it comes to creating this vertically written program flowchart, there exist the following problems.

As described above, the flow of the control performed on the data are written in a sequence so as to follow a vertical time axis, but the flow of the data itself is described in a horizontal direction among the reference numerals for the processing and the like. Furthermore, the continuity of the flow of the data is difficult to understand due to the flow of the control.

Therefore, the flow of the control of the vertical direction and the flow of the data of the horizontal direction are both simultaneously and contradictorily present inside the vertically written program flowchart, and the flow of the data is cut off.

As the flow of the control becomes more complicated and as the number of types of data increases, this problem becomes more remarkable.

Meanwhile, the source program at Step 1 mentioned above is expressed one-dimensionally, and the flow of the control and the flow of the data are broken off from each other, making it even more difficult to understand than the above-mentioned vertically written flowchart.

SUMMARY OF THE INVENTION

Therefore, an object of the present invention is to provide a multi-dimensional programming device and a multi-dimensional programming method for creating a multi-dimensional, horizontally written flowchart which solves the inconvenient aspects of the vertically written program flowchart in the work performed at the above-mentioned Step 1, and also drastically changes the programming method.

In order to achieve this object, the present invention is a multi-dimensional programming device comprised of an object file unit storing object information for creating a multi-dimensional, horizontally written flowchart, such as a two-dimensional flowchart, a three-dimensional flowchart and a four-dimensional flowchart; an object editing unit for using the object information read from the object file unit to edit the multi-dimensional flowchart; a drafting unit for drafting the edited multi-dimensional flowchart; and a saving unit for saving the edited multi-dimensional flowchart into the object file unit.

Further, the present invention is a multi-dimensional programming method for reading object information from an object file unit storing object information for creating a multi-dimensional, horizontally written flowchart, such as a two-dimensional flowchart, a three-dimensional flowchart and a four-dimensional flowchart; using the object information to edit the multi-dimensional flowchart; drafting the multi-dimensional, horizontally written flowchart, such as the two-dimensional flowchart, the three-dimensional flowchart, and the four-dimensional flowchart, based on the edited multi-dimensional flowchart; and saving the edited multi-dimensional flowchart into the object file unit.

Hereinafter, explanation will be made of an idea which forms a foundation upon which the inventor arrived at the present invention.

As is evident from experience, when one's viewpoint on a three-dimensional rectangular parallelepiped changes, a variety of shapes can be seen. For example, the shape seen from the front, the shape seen on a flat surface and the shape seen from a side are all different from each other. That is, there are portions which can be seen and cannot be seen, depending on the viewpoint.

If this principle is extrapolated to a multi-dimensional rectangular parallelepiped, the image seen from directly above, the image seen from the middle, the image seen from a slanted angle above and the like each involve portions which can be seen and portions which cannot be seen according to that particular viewpoint.

According to the position of each viewpoint specified by means of coordinates, it is thought portions can be seen and cannot be seen and the coordinate axis changes.

Next, a program will be compared to a multi-dimensional rectangular parallelepiped, and a concept of programming space will be developed.

First, consider a three-dimensional programming space, based on time, data and control comprising a program. This space is defined as "basic programming space" (also called "three-dimensional basic coordinates").

The basic programming space can be depicted as a diagram as shown in FIG. 1.

That is, the diagram is drafted with a flat surface diagram 1 which is a flat surface formed by a control axis and a flow axis (i.e., a time axis), a front surface diagram 2 which is a flat surface formed by a data axis and the flow axis (i.e., the time axis), and a side surface diagram 3 which is a flat surface formed by the control axis and the data axis.

There are also instances in which programming such as an event process, for example, is added to this kind of basic programming space to make a four-dimensional programming. This is considered that the basic programming spaces are layered as shown in FIG. 2.

In FIG. 2, there are layered an Event Process 1, Event Process 2, Event Process 3, Event Process 4 and Event Process 5 going down from the top.

In FIG. 2, the data axis and the event axis appear to overlap each other, but if the viewpoint is changed they appear as in FIG. 3.

It is possible to think of this kind of programming as a multi-dimensional rectangular parallelepiped.

However, the display and the like which are used when the program is to be edited are two-dimensional display devices, and it is impossible for such devices to make the multi-dimensional space visible in actual multiple dimensions.

Therefore, the basic programming space shown in FIG. 1 can be opened up into a flat surface as shown in FIG. 4.

Here, the input-output and the predefined process are shown in a control flow surface 10. The input-output control timing is the point of the flow of the controls. Thus, this is written in the flat surface.

The flow of the data is displayed in a data flow surface 20.

The data is inputted from an input device, goes through a CPU and enters an internal memory such as a register. This becomes the starting point of the flow of the data. On the other hand, since the output of the data is sent from the internal memory through the CPU to an output device or the like, the end of the data flow is the point in time when the data is sent, and the flow of the data is displayed.

A data state surface 30 displays the state of the internal memory at the time of each process.

The horizontal axis in FIG. 4 represents the time axis, and a horizontally written flowchart can be drawn along the time axis to represent the control flow and the data flow.

A portion 21 surrounded by perpendicular lines of the data flow surface 20 indicates an aggregation of state changes, so this state aggregation is displayed in the data state surface 30. When there are many state aggregation, the above-mentioned portion 21 is displayed by scrolling.

Accordingly, the data state surface 30 displays the state of a memory for temporarily storing the data, such as the state of an internal memory provided inside the CPU, for example.

An unused display region 4 may also be used as the data state screen for displaying the aggregation of memory state changes.

Note that, bold double lines 70 and 71 shown in FIG. 4 assume a cursor which will be described below.

In order to enable the display of the basic programming space such as is described above onto a two-dimensional display device, the present invention is provided with an object file unit in which there is stored object information for creating a multi-dimensional, horizontally written flowchart, such as a two-dimensional flowchart, a three-dimensional flowchart and a four-dimensional flowchart.

The object information saves program flowchart symbol information, such as a start terminator and an end terminator, along with coordinate information (for example coordinate information specifying a location by rows and columns), cell information described as, for example, an area of an intersection of the coordinates (e.g., the rows and the columns), character information and the like.

In order to make the multi-dimensional space visible on a two-dimensional display device such as a display, it is important to include the coordinate information in the object information. It is desirable for the coordinate information to include a combination of a time axis, a data axis and a control axis, a combination of the time axis, the data axis, the control axis and a CPU axis, a combination of the time axis, the data axis, the control axis, the CPU axis and an event axis; a combination of the time axis, the data axis, the control axis, the CPU axis, the event axis and a condition axis; and a combination of the time axis, the data axis, the control axis, the CPU axis, the event axis, the condition axis and a PC axis.

The program is logic across time, so the combinations with time are essential. This type of coordinate information enables the programming space to be turned into a flat surface.

Note that it is presumed that the number of CPUs contributing to the program is one. If the CPU axis is omitted, then the combination of the time axis, the data axis, the control axis and the CPU axis in the above coordinate information becomes the basic programming space.

The next problem to be taken up is how each of the above axes are assigned to the screen such as a display.

According to the present invention, in a screen which is drafted with the time axis, the data axis, the control axis, the CPU axis, the event axis, the condition axis and the PC axis as its coordinate information, a screen construction is used in which a horizontal axis becomes the time axis and a vertical axis is used for the data axis, the control axis, the CPU axis, the event axis, the condition axis and the PC axis.

That is, placing the time axis, which is common throughout the programming space, on the horizontal axis enables the programming space to be turned into the flat surface more accurately.

The object editing unit of the present invention makes a programming space displayable on the screen by means of three-dimensional basic coordinates which take the horizontal axis as the time axis and use the vertical axis for at least the data axis and the control axis, and also performs the editing of the screen and the like according to an input command signal.

In other words, the time axis is displayed and at least the data axis and the control axis are displayed on the vertical axis on the horizontal axis of the screen such as the display; therefore, the each of the cells which are specified by the time axis, the data axis and the control axis have objects written into them in accordance with the input command signal, for example.

Thus, in order to take a cross section for the programming space and see an inside portion of the program, the object editing unit makes it possible to switch the dimension being shown.

In order to see the inside portion for the programming space that is assumed as a multi-dimensional rectangular parallelepiped, it is sufficient to cut a cross section at a given place.

For example, by cutting a cross section at A—A in FIG. 2, it becomes possible to grasp the content of each of the events taking place at a given point in time along the control axis.

This editing process which takes place on the screen such as the display corresponding to the cross-sectional cutting of the program space is a switching of dimensions. In other words, it is a changing of the location of the viewpoint.

This switching of the dimension enables the inside of the multi-dimensional space to be made visible and promotes comprehension of the programming.

Further, in the case of the screen construction in which the vertical axis represents the data axis, the control axis, the CPU axis, the event axis, the condition axis and the PC axis, flat surfaces of draftable programming spaces are made into a group and assigned by means of tabs.

Accordingly, in the case where the screen of the display device such as the display is narrow, the introduction of the tabs makes it possible to divide the flat surfaces of the display device into several groups, assign tabs, switch the display screens by clicking on the tabs, and thus use the screen in a versatile fashion.

Similarly, in the case where the screen of the display device is narrow, it becomes difficult to view the entire program.

Therefore, the object editing unit is provided with a function for shrinking or restoring the coordinate information by units of rows and columns.

Accordingly, it becomes possible to switch between a screen viewing the entire program and a detailed screen of a particular portion.

Further, the object editing unit is provided with a function for burying a given coordinates axis into another coordinates axis, such as by decreasing the number of dimensions, centered around the time axis which is common throughout the programming space.

Accordingly, it is possible to decrease the number of dimensions in the limited screen of the display device.

Further, the saving unit contains horizontal slit information having one line's worth of cell objects, and flat surface object information having an object on a flat surface corresponding to the horizontal slit.

The program is a logic which is intimately connected with time, and it is desirable to be able easily to apprehend what paths the program took in the past and what paths it may take in the future.

When this is possible, the horizontal slit has one line's worth of cell objects, and the flat surface object information has an object on the flat surface so as to correspond to the horizontal slit; therefore, it is possible to copy the past progress and the future changes of the program onto the screen.

BRIEF DESCRIPTION OF THE DRAWINGS

In the accompanying drawings:

FIG. 6 is an explanatory diagram of illustrating class definition;

FIG. 7 is a diagram of a member function definition screen;

FIG. 9 is a diagram of an example of screen display of the multi-dimensional programming device according to the present invention;

FIG. 12 is a plan view of an example display of a three-dimensional programming flowchart;

FIG. 13 is an elevation view of the example display of the three-dimensional programming flowchart;

FIG. 14 is a side elevation of the example display of the three-dimensional programming flowchart;

FIG. 15 is a cross-sectional diagram of a four-dimensional programming space;

FIG. 16 is a cross-sectional diagram of the four-dimensional programming space;

FIG. 17 is a cross-sectional diagram of the four-dimensional programming space;

FIG. 24 is an example of a four-dimensional expanded screen display;

FIG. 25 is an example of a four-dimensional shrunken screen display;

FIG. 28 is an example of a screen display of four-dimension burying;

FIG. 29 is an example of a screen display of data copying;

FIG. 30 is an example of the screen display of the data copying; and

DETAILED DESCRIPTION OF THE PREFERRED EMBODIMENTS

Hereinafter, explanation will be made of an embodiment of the present invention, with reference to the drawings.

Figure 5:
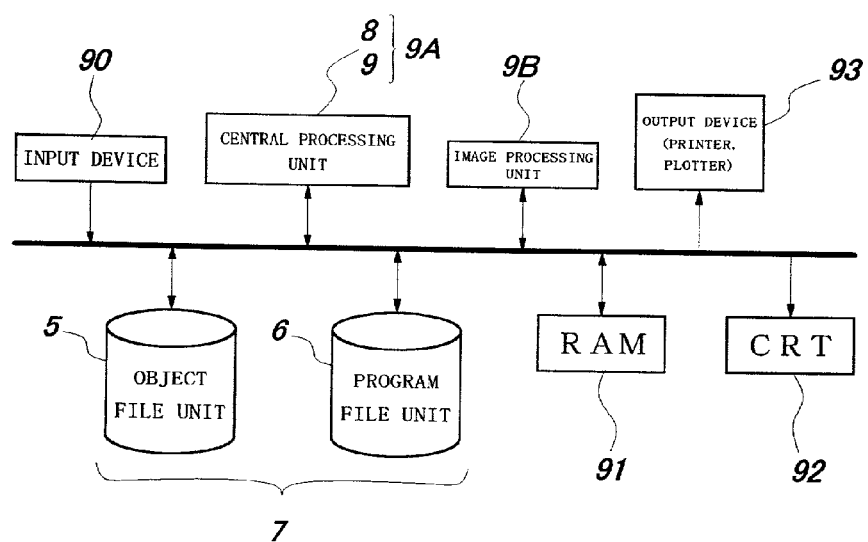
FIG. 5 is a diagram of an example construction of a multi-dimensional programming device according to the present invention.

As shown in FIG. 5, a multi-dimensional programming device (hereinafter referred to simply as "device") according to the present embodiment is comprised of a memory means 7 equipped with a program file unit 6 and an object file unit 5 for storing object information for making a multi-dimensional, horizontally written flowchart; a central processing unit (CPU) 9A equipped with an object editing unit 8 for editing the multi-dimensional flowchart using the object information read from the object file unit 5 and a saving unit 9 for saving the edited multi-dimensional flowchart into the object file unit 5; and an image processing unit 9B acting as a drafting unit for drafting the edited multi-dimensional flowchart.

The device is equipped with an input device 90 comprised of a keyboard, a mouse, a digitizer and the like; a RAM 91 for temporarily saving data processed by the central processing unit 9A; a CRT 92 which acts as a display device; and an output device 93 such as a printer.

The object file unit 5 stores an object ID, coordinate information, cell information, character information and the like.

The above mentioned object ID has standard symbolic information for the program flowchart, including start terminators, end terminators, start loop limit, end loop limit, two branch decisions, multiple branch decisions, recombining, start parallel mode, end parallel mode, data input, data output, process, predefined process and the like.

In order to make macros, it is also possible to write in IDs for macro command start terminators, macro command end terminators, macro branches and macro recombining.

The coordinate information includes a combination of the time axis, the data axis and the control axis, a combination of the time axis, the data axis, the control axis and the CPU axis, a combination of the time axis, the data axis, the control axis, the CPU axis and the event axis; a combination of the time axis, the data axis, the control axis, the CPU axis, the event axis and the condition axis; and also a combination of the time axis, the data axis, the control axis, the CPU axis, the event axis, the condition axis and the PC axis.

Here, PC denotes a computer connected with LAN.

In the above-mentioned cell information, the cell widths, namely the intervals along a time axis between the coordinates in the coordinate information, are automatically adjusted to the size of the chart symbols. Note that the height of the cells is uniform. Information about the color of the cells or the like is also included.

The character information stores the color of the characters, the background color behind the characters and the character strings (assignments, branch conditions, etc.).

Additionally, the memory means 7 also stores color information for the symbols in the chart and flow test flags (0: untested, 1: test completed).

It is also possible to provide an abbreviation dictionary file unit 70 (not shown) to the memory means 7.

When the surface area of the display screen of the display device 92 is limited and when its width is too narrow, if identifiers such as the names of functions and variables are too long, the display of the data flow and the control flow becomes short, and it becomes difficult to understand the flow. Therefore, it is desirable for the memory means 7 to have an abbreviation dictionary used in that particular programming which is currently being created.

Long identifiers are defined as shortened abbreviations and are recorded into the abbreviation dictionary. The abbreviations are used in place of the long identifiers, and thus it becomes possible to display the flow for a long time and the programming becomes easy to understand.

In addition to the abbreviation dictionary which is to be used particularly for that programming, it is also possible to prepare an abbreviation dictionary which is to be used across the entire system.

It is also possible to provide the memory means 7 with a class library 71 (not shown).

In the C++ programming language, the concept of classes closely links data and a program together (referred to as capsulizing). It is desirable to incorporate this type of object oriented programming to the multi-dimensional programming of the present invention.

The definitions of the classes can be represented as a chart as in FIG. 6.

External variables 1, 2, 3, 4 . . . are defined outside member functions 1, 2, 3, 4 . . . so they are external variables.

Figure 4:
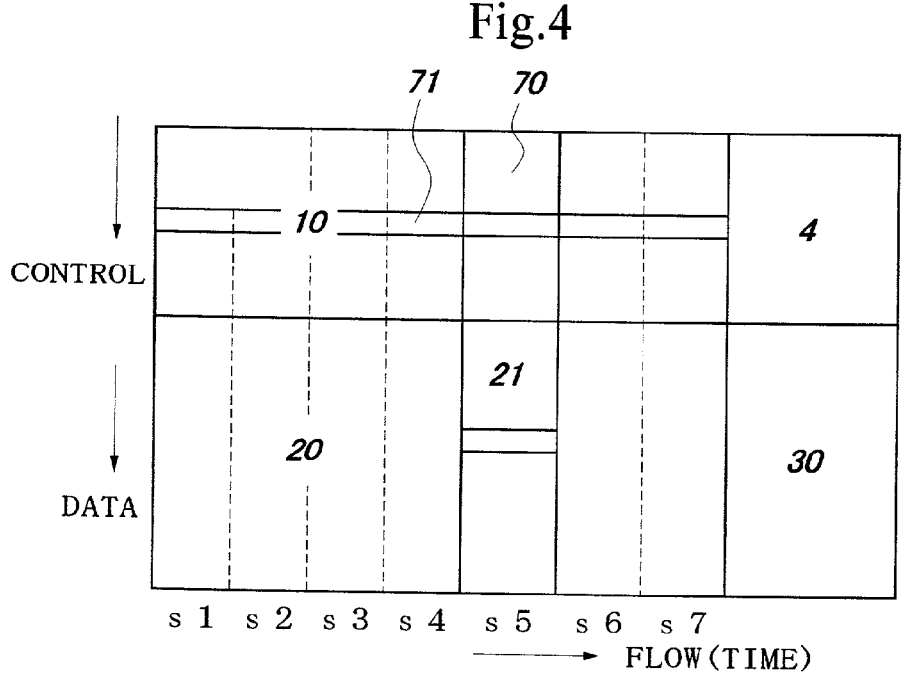
FIG. 4 is a developed diagram of the basic programming space depicted in FIG. 1.

Accordingly, access can be made freely from the member functions. The external variables are described on a data flat surface (which corresponds to a data flow surface 20 in FIG. 4 described below).

The number of arguments of each of the member functions is different for each member function, and the argument and an internal variable are both described in the data flat surface.

Derivative classes are classes delivered from basic classes. The basic classes are the classes upon which other classes are delivered. Also, a configuration is adopted such that when a member function is clicked on, the screen switches over to a multi-dimensional programming screen and the member functions can be defined.

Note that FIG. 7 shows the screen for defining the member functions.

This figure shows a control flat surface (which corresponds to a control flow surface 10 in FIG. 4 described below) and a data flat surface. When the defining of the member function 3 is completed, the screen returns to the preceding class definitions and can then proceed to defining of a subsequent member function.

Note that the program file unit 6 stores software used for multidimensional programming such as a spreadsheet software program as an application software.

Figure 8:
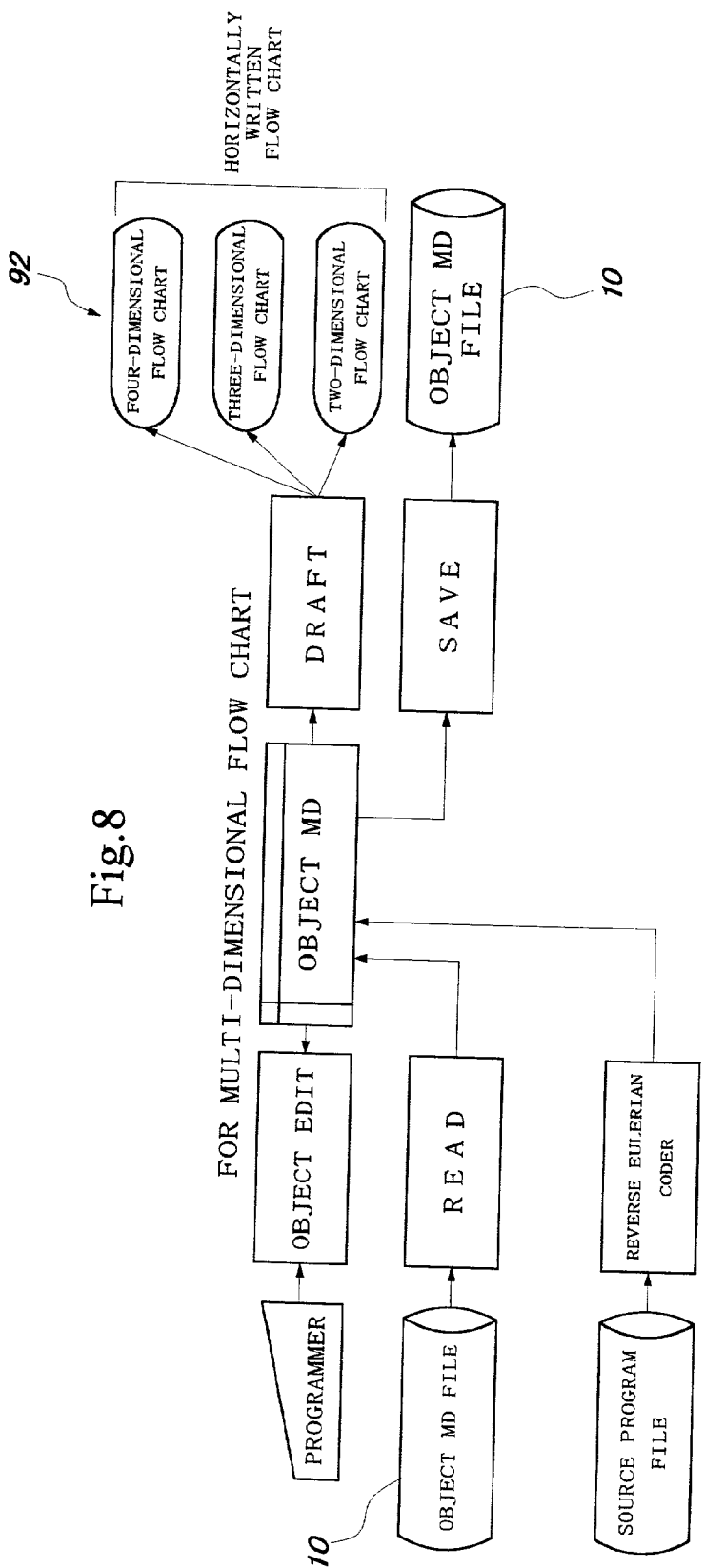
FIG. 8 is a system flowchart according to the present invention.
Figure 10:
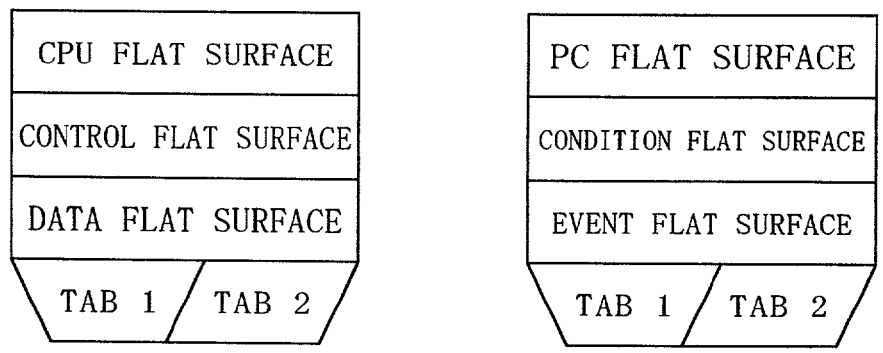
FIG. 10 is an example of the same screen display.

FIG. 8 shows the flow of the processing performed by the device constructed as described above.

Specifically, the central processing unit 9A reads an object MD (i.e., the object information) from an object MD file (i.e., the object file unit 5) which stores the object information for making the multi-dimensional horizontally written flowcharts such as a two-dimensional flowchart, a three-dimensional flowchart and a four-dimensional flowchart.

Next, the central processing unit 9A uses the object information to edit the multi-dimensional flowchart according to input instructions from a programmer.

Then the multi-dimensional horizontally written flowcharts such as the two-dimensional flowchart, the three-dimensional flowchart, and the four-dimensional flowchart are drafted based on this edited multi-dimensional flowchart, and are displayed on the display device 92.

Meanwhile, the central processing unit 9A saves the edited multi-dimensional flowchart into the object file unit 5.

Next, a more specific explanation of the processing performed by the device will now be made.

When the device is booted, a file menu is displayed on the screen of the display device 92.

If a new chart is to be made, a button indicating so is pushed and the next dimensions are defined.

The coordinates of the dimensions are displayed on the screen of the display device 92 with the three dimensions as the basic coordinates, the three dimensions taking a horizontal axis as a time axis, and a vertical axis as at least a data axis and a control axis. Note that the dimensions may be increased freely. For example, a seven-dimensional space could produce a screen display model such as the one shown in FIG. 9.

Next, the definition for the classes and the functions is performed.

Note that the size of the display screen of the display device 92 is fixed, so the more dimensions are increased, the more difficult it becomes to view the display screen. However, when this occurs, tabs may be introduced to divide the flat surface into several groups and assign tabs to them.

Then, when the tabs in the display screen of the display device 92 are clicked on, the central processing unit 9A receives a command to perform control which make the display screen switch over.

Next, the programmer drafts the flowchart symbols or the like inside the cells of each of the flat surfaces, according to the program flowchart symbols information and the like which has been read out from the object file unit 5.

Further, the character strings are drafted into predetermined positions inside the cells based on consideration of the links between the character strings and the objects from the character string information which has been read out from the object file unit 5.

On the screen, a cursor indicating a write location appears as a slit-type cross cursor.

Figure 11:
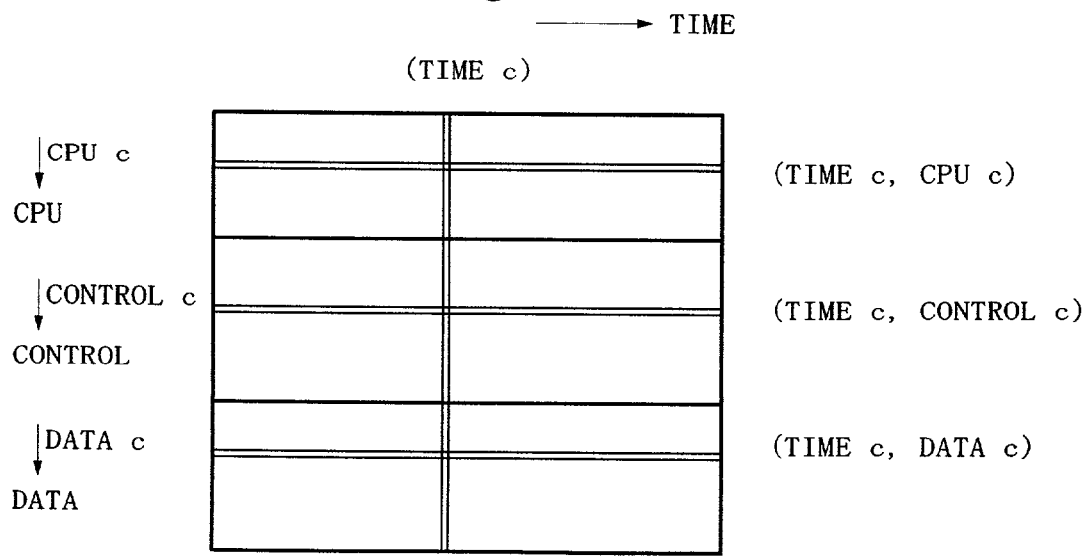
FIG. 11 is an explanatory illustration of a cursor in the same screen display.

For example, in a screen having four-dimensional coordinates as in FIG. 11, if the location where the cursor exists were to be expressed as cursor coordinates, the cursor coordinate at a certain time c would be expressed as a combination of four numerical values (time c, data c, control c and CPU c). In other words, the cursor is positioned at time-CPU flat surface, time-control flat surface and time-data flat surface.

Figures 12, 13, 14:
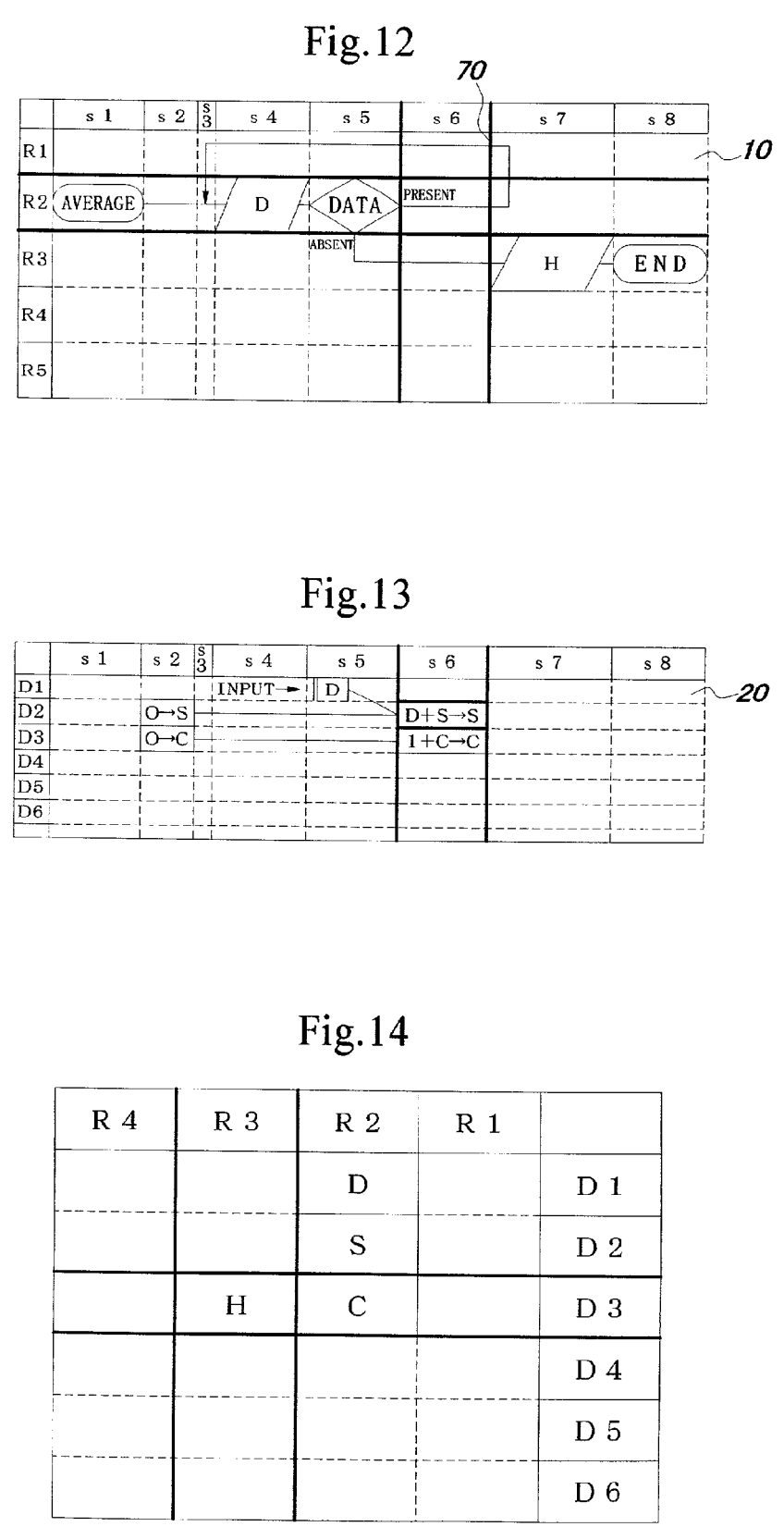

FIG. 12 and FIG. 13 show a program created according to the device.

Note that, in these diagrams, the horizontal axis "S" indicates time, the vertical axis "R" indicates the control and "D" indicates the data.

FIG. 12 shows an example of display of the time-control flat surface of a program which looks for an average value. FIG. 13 shows what a time-data flat surface of the same would look like from a cross-sectional view taken at a position R2 of a cross-type cursor 70.

In FIG. 13, S3 contributes to the flow of the control and S5 is a decision, so it is not displayed on a data flow surface 20. The double line at S5 indicates input from outside, and it is intended to increase the comprehensibility of the data flow.

Also, if a side elevational view from a loop end point (S6) were to be illustrated in FIG. 12, then the states of variables S and C would be displayed as in FIG. 14.

When this program for finding the average value is executed, specific numerical values are stored in an internal memory, so the numerical values are displayed in the side elevational view.

According to the above programming example, the "flow of the control" and the "flow of the data" in the program flowchart are neatly organized, and thus a flowchart which is easy to understand can be displayed.

Next, explanation will now be made of a four-dimensional program flowchart in which an event axis has been added to the three-dimensional basic coordinates mentioned above.

Figure 3:
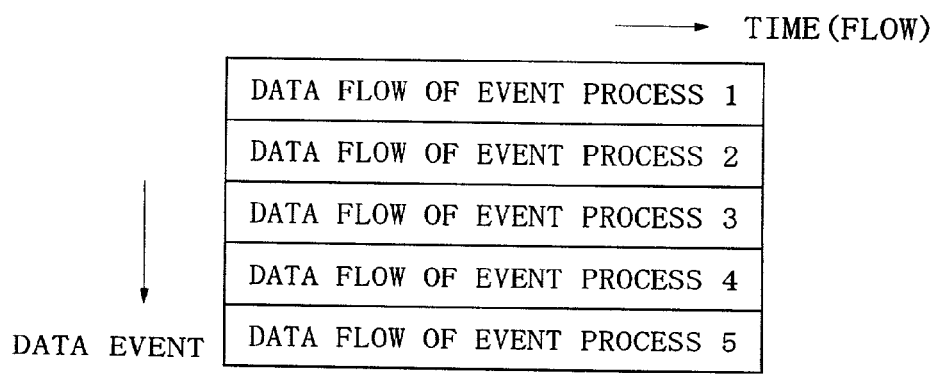
FIG. 3 is a front elevation view of the same.

When the state of the program, or namely, an even at a certain point in time along the line of flow of the control, is included in the combination configured in FIG. 3, then a table such as the one shown in FIG. 15 can be drawn.

Here, when a cross-section is taken with the control flow of State 1, a data flow such as the one in FIG. 16 is seen. That is, the connection can be seen clearly between the data flow until State 1, the data flow until Event Process 1 and the data flow after the event process.

However, this leaves the data flows of other event processes unconnected, so the data flows of the event processes need to be shifted upward and downward to restore the connectivity as in FIG. 17.

With respect to the control flows, however, the control flow of the uppermost Event Process 1 can be seen, but the event processes below the Event Process 1 are all hidden and thus cannot be seen.

Figure 18:
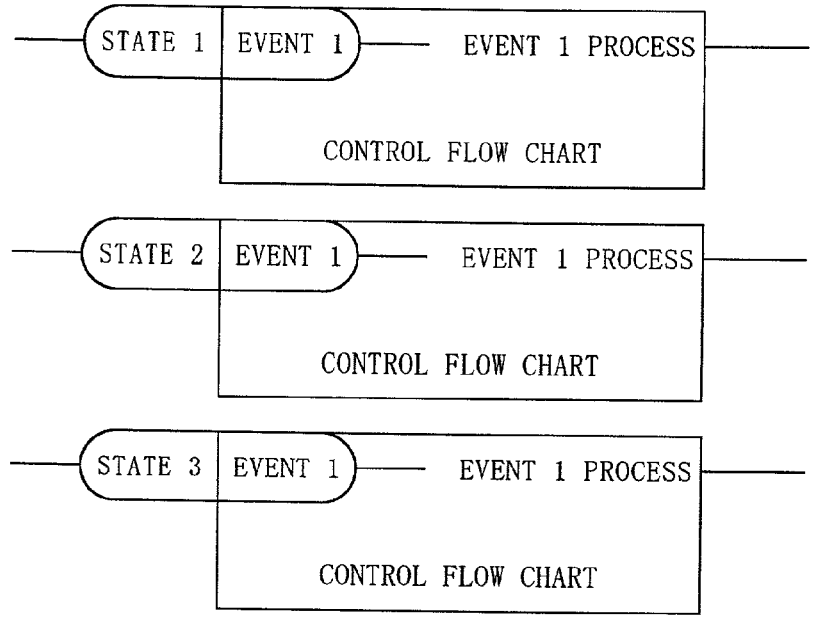
FIG. 18 is an example of a four-dimensional screen display.

In order to solve this problem a screen structure such as the one in FIG. 18 is adopted. In FIG. 18, when a click is made on a part of Event 1 of State 1, the signal from the click makes the control flowchart of process of Event 2 so that it is displayed. In other words, each time a click is performed, the data for the control flowchart of the subsequent event is called up and can be displayed on the screen.

Figure 1:
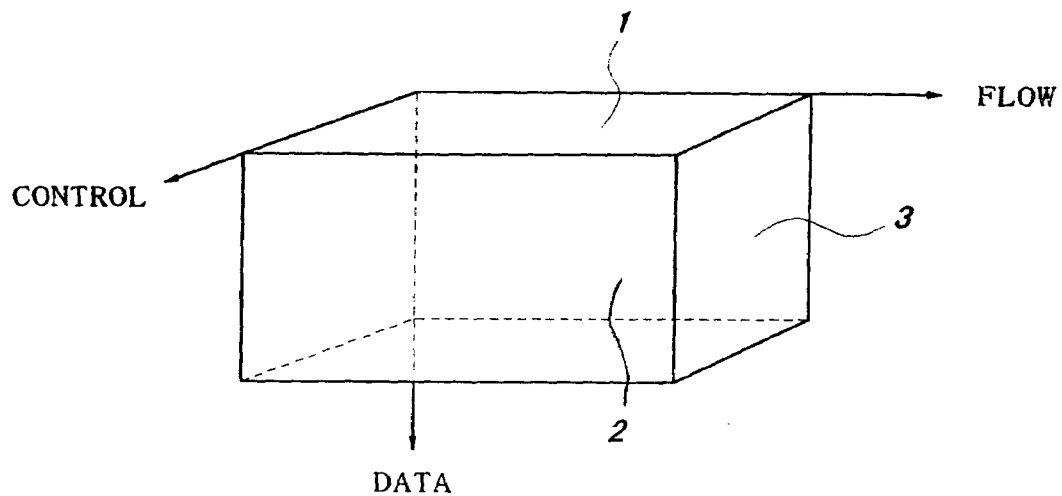
FIG. 1 is a viewpoint diagram of a basic programming space which is the premise of the present invention.
Figure 2:
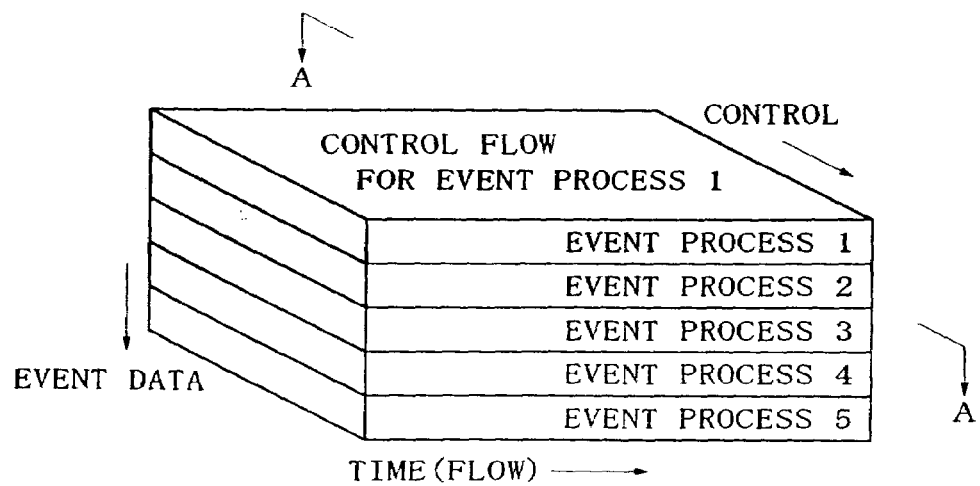
FIG. 2 is a viewpoint diagram of a four-dimensional programming space.

The operations correspond to the cutting of the programming space shown in FIG. 2, cutting the space at a right angle along the event axis.

Figure 19:
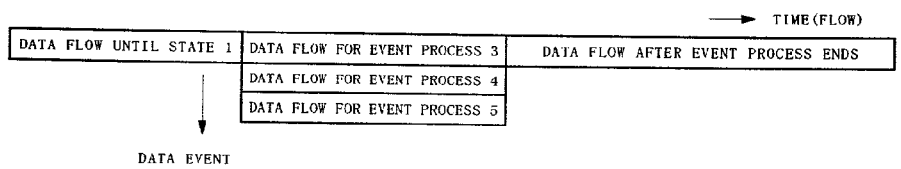
FIG. 19 is a cross-sectional diagram of the four-dimensional programming space.
Figure 20:
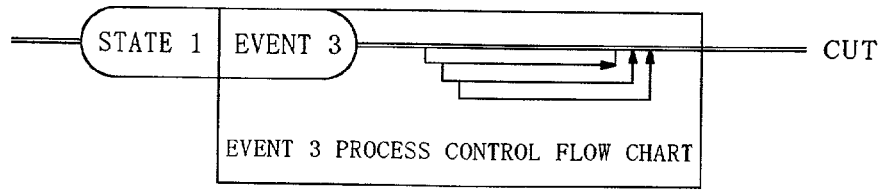
FIG. 20 is an example of the four-dimensional screen display.

In other words, the data flowchart made by cutting at State 1 and cutting in between Event 2 and Event 3 is shown as shown in FIG. 19, but FIG. 20 shows how it may be shown from directly above.

Figure 21:
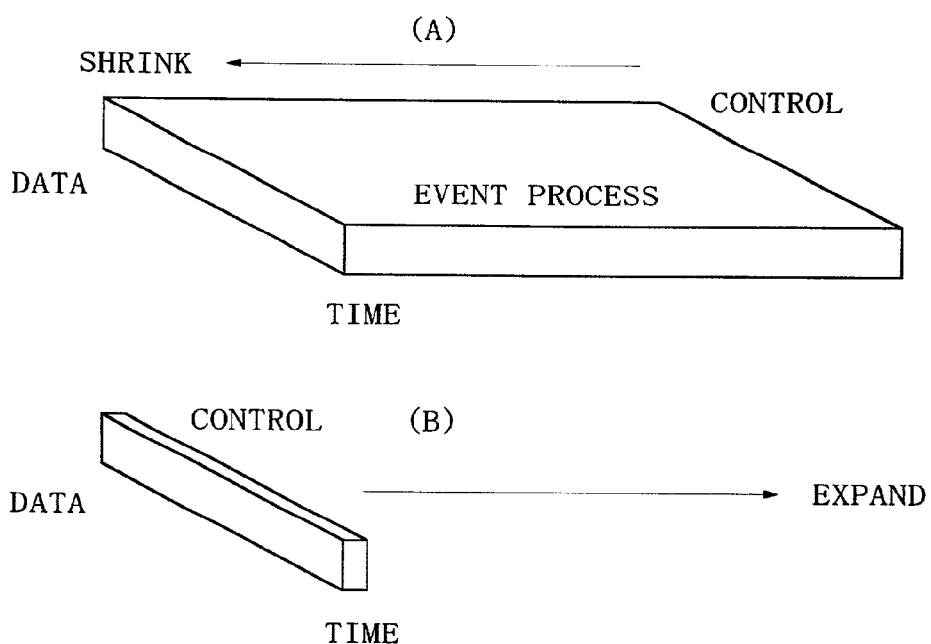
FIG. 21 is a shrunken diagram and an expanded diagram of the four-dimensional programming space (A) and (B), respectively.

As the flow of control for the event processing becomes larger, the intervals between State 1, State 2 and State 3 become wider and the overall view of the processing becomes more difficult to see. In order to improve this, it is desirable to shrink the control flow from the event processing unit in the basic programming space and enlarge the same as necessary, as indicated by the symbols (A) and (B) in FIG. 21.

These enable the intervals between State 1, State 2 and State 3 to be made narrower, so the flow of the control of the program are improved on the whole.

Figure 22:
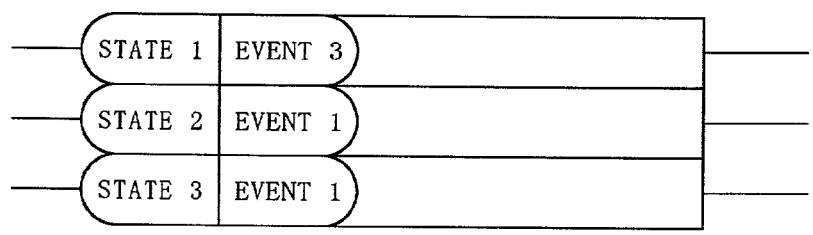
FIG. 22 is an example of the four-dimensional screen display.
Figure 23:
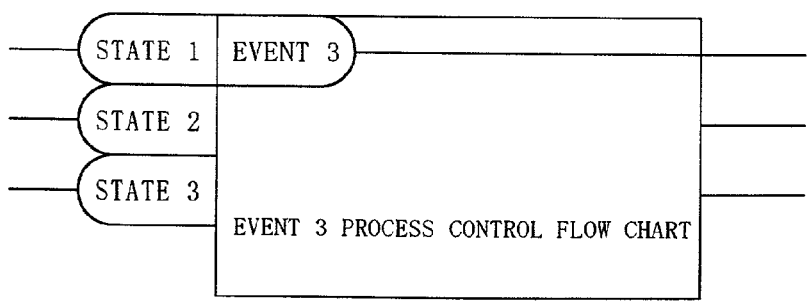
FIG. 23 is an example of the four-dimensional screen display.

That is, the screen display becomes the shrunken display in FIG. 22, and the expanded display in FIG. 23.

The expansion and shrinking of the above-mentioned event process can also be performed as screen displays such as the ones shown in FIG. 24 and FIG. 25.

In the case where the screen of the display device 92 is narrow, it becomes difficult to view the entire processing as a whole; however, as long as there are the above-mentioned functions for shrinking and restoring (i.e., expanding), it is possible to switch between the overall view and the detailed view while working.

FIG. 24 is the original event process screen and lines of Control 1 through Control 12 are displayed in succession.

FIG. 25 shows the event process in a shrunken form, and each of the lines for Control 4, 5, 7, 8, 10 and 11 from the screen in FIG. 24 are shrunken, new lines are added as the shrinking permits and the overall view becomes easier to see.

Figure 26:
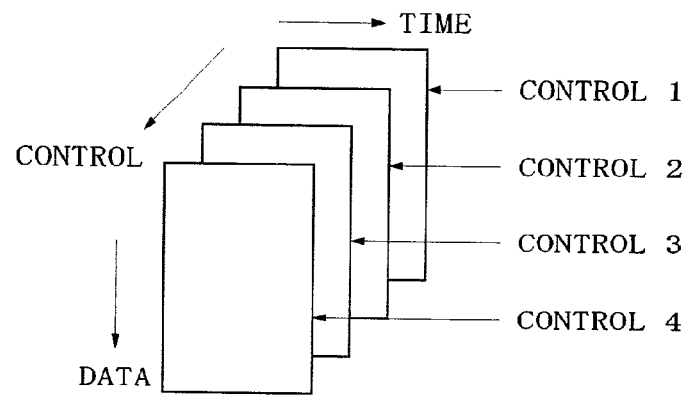
FIG. 26 is an explanatory illustration of burying between the basic programming space.
Figure 27:
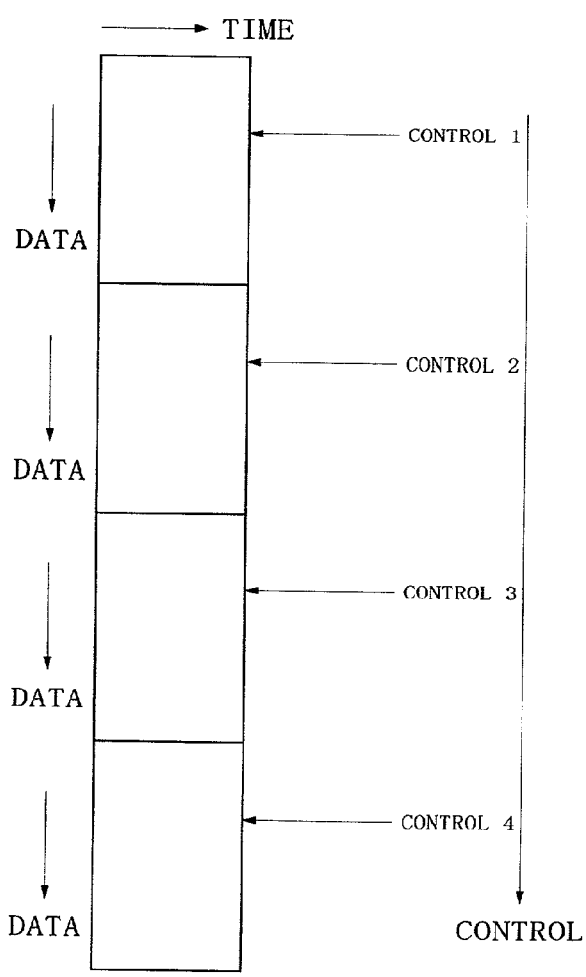
FIG. 27 is an explanatory illustration of burying between the basic programming space.
Figure 31:
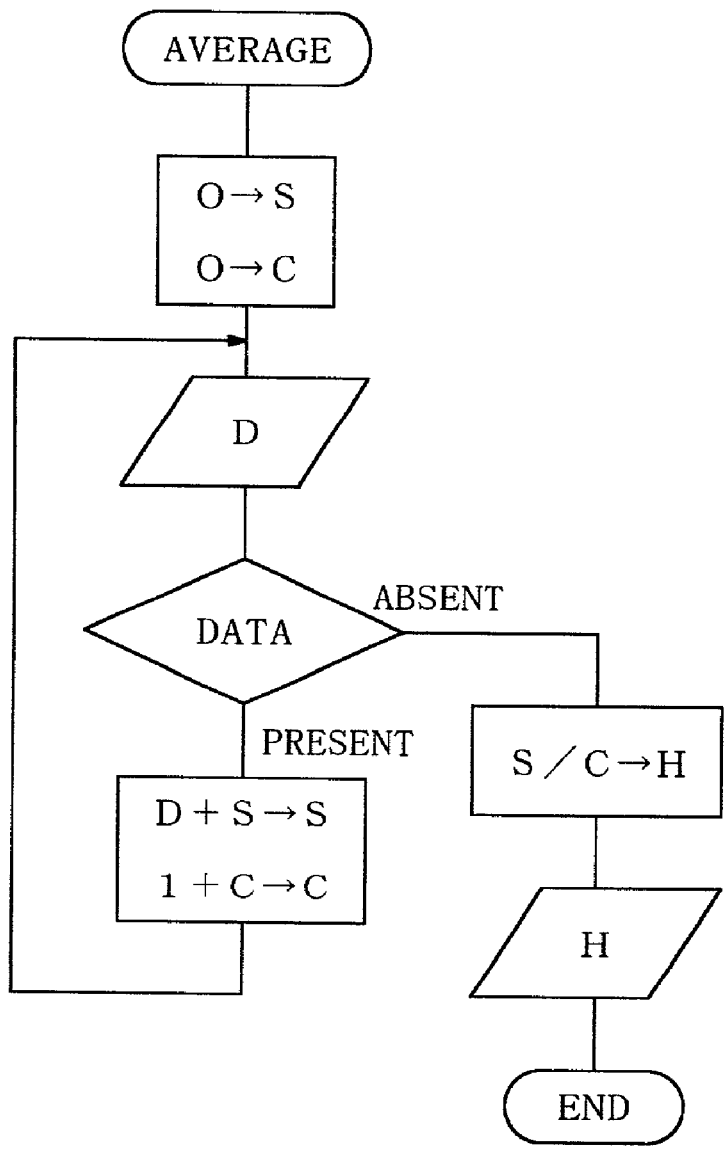
FIG. 31 is an example of a screen display of conventional programming.

If the basic programming space were to be expressed in spreadsheet format of spreadsheet software, the spaces in a three-dimensional program would be displayed as in FIG. 26, and if as the number of dimensions is reduced, the display can be made as in FIG. 27.

In FIG. 26 the time-control flat surface portion of the program has been stripped off. This is an instance of two-dimensional flat surfaces being layered and turned into a three-dimensional program.

When the tables are lined up in order on a flat surface with time as the common point among them as in FIG. 27, then they become two-dimensional.

Thus it is possible to bury the time-data flat surface into the time-control flat surface.

Next, explanation will now be made of the case in which the four-dimensional screen is reduced to two-dimensions to be buried.

It is assumed here that the tables in FIG. 27 are lined up along a CPU axis.

This screen was originally a collection of cells of four-dimensional spaces (i.e., the dimensions being time, data, control and the CPU), and three-dimensional cell spaces (i.e., being comprised of time, data and control) are selected from the spaces and a two-dimensionalized version of these (i.e., time and data/control) becomes a line of three-dimensional tables. When these tables are turned into two-dimensional tables, they are displayed as the tables in FIG. 28.

Multi-dimensional screens comprised of four dimensions or more may also be turned into two-dimensions according to a similar procedure.

Note that performing the above operations in the opposite order can return the tables to their original number of dimensions.

The program is a logic which is intimately connected to time, so it is desirable that it be possible easily to apprehend what paths it was the program has passed in the past, and what paths it will be possible for the program to follow in the future.

Accordingly, the program is seen as being made of something soft such as rubber, such that its variation along the direction perpendicular to the time axis may be realized freely.

A slit-shaped cursor is convenient when using it as a place for holding the past paths. This will be explained with a flat surface-CPU screen of FIG. 29.

The cursor is located at (time 4, CPU 1). The slit located at CPU 1 is referred to as a CPU slit.

The CPU slit is an object for holding one line's worth of cell objects.

Meanwhile, an object for holding one cell's worth of information pertaining to time is a time slit.

In the CPU slit in the same diagram, there is included an object ID which indicates coordinate information, operation possibility information, start parallel mode information and end parallel mode information.

The coordinate information contains (time 1, CPU 1), (time 2, CPU 1), (time 3, CPU 1), (time 4, CPU 1), (time 5, CPU 1), (time 6, CPU 1) and (time 7, CPU 1).

Further, the operation possibility information contains an operation possibility object ID for (time 1, CPU 1) through (time 7, CPU 1).

Also, the start parallel mode information contains an object ID for (time 3, CPU 1), and the end parallel mode information contains an object ID for (time 6, CPU 1).

Next, the cursor location is dropped to (time 4, CPU 2) as shown in FIG. 30.

The dotted line in FIG. 30 indicates a portion which is made to appear empty in order to copy into the CPU slit.

The cells at the coordinates (time 1, CPU 2), (time 2, CPU 2), (time 6, CPU 2) and (time 7, CPU 2) are actually empty.

The CPU slit object is displayed in the empty cell just as it is.

The cell at the coordinates (time 3, CPU 2) is a start parallel mode object ID, so it displays an object corresponding to the cells at (time 3, CPU 1) and (time 3, CPU 2) and saves the object at (time 3, CPU 2) into the CPU slit.

The cells at the coordinates (time 4, CPU 2) and (time 5, CPU 2) are not empty, so they are saved and displayed at time 4 and 5 of the CPU slit.

The cells at the coordinates (time 4, CPU 1) and (time 5, CPU 1) are operation capability object IDs, so corresponding objects are shown therein.

The cell at the coordinates (time 6, CPU 2) is the end parallel mode object ID, so it displays an object or objects to be saved in a corresponding CPU slit.

The cell at the coordinates (time 6, CPU 1) is shown appearing empty.

The cell at the coordinates (time 7, CPU 2) is empty, and when it is empty, the CPU slit is displayed just as it is.

The cell at the coordinates (time 7, CPU 1) appears empty on the screen. Thus, the past progress and the future changes are copied into the CPU slit by means of the processing described above.

The program which has been edited according to the operations described above is named, and then saved into the object file unit 5.

According to the present invention, it is possible to provide the multi-dimensional programming device and the multi-dimensional programming method for creating multi-dimensional, horizontally written flowcharts, which solves the problems experienced in vertically written program flowcharts or the like, and also, drastically changes the programming technique.

What is claimed is:

1. A multi-dimensional programming device, comprising: an object file unit storing object information for creating a multi-dimensional horizontally written flowchart, an object editing unit for using object information read from said object file unit to edit said multi-dimensional flowchart, a drafting unit for drafting said edited multi-dimensional flowchart, and a saving unit for saving said edited multi-dimensional flowchart in said object file unit, said object information including program flowchart symbol information, coordinate information, cell information and character information, said coordinate information including a combination of (i) a time axis, a data axis and a control axis, (ii) the time axis, the data axis, the control axis and a CPU axis, (iii) the time axis, the data axis, the control axis, the CPU axis and an event axis, (iv) the time axis, the data axis, the control axis, the CPU axis, the event axis and a condition axis, and (v) the time axis, the data axis, the control axis, the CPU axis, the event axis, the condition axis and a PC axis.

2. The multi-dimensional programming device according to claim 1, wherein a screen is drafted with the time axis, the data axis, the control axis, the CPU axis, the event axis, the condition axis and the PC axis as its coordinate information, and said screen is constructed and arranged such that a horizontal axis is used for the time axis and a vertical axis is used for the data axis, the control axis, the CPU axis, the event axis, the condition axis and the PC axis.

3. The multi-dimensional programming device according to claim 1, wherein said object editing unit (i) makes programming space displayable on a screen by means of three-dimensional basic coordinates which use a horizontal axis for the time axis and a vertical axis for at least the data axis and the control axis, and (ii) performs editing of said screen according to an input command signal.

4. The multi-dimensional programming device according to claim 3, wherein said object editing unit enables dimensional switching to take a cross section of said programming space to reveal an inside portion of a program.

5. The multi-dimensional programming device according to claim 1, wherein said object editing unit is constructed and arranged to make flat surfaces of draftable programming spaces into a group and to assign tabs to said flat surfaces in a screen construction in which the vertical axis represents the data axis, the control axis, the CPU axis, the event axis, the condition axis and the PC axis.

6. The multi-dimensional programming device according to claim 1, wherein said object editing unit includes a function for at least one of shrinking and restoring said coordinate information by units of rows and columns.

7. The multi-dimensional programming device according to claim 1, wherein said object editing unit includes a function for burying a given coordinates axis into another coordinates axis centered around the time axis throughout a programming space.

8. The multi-dimensional programming device according to claim 1, wherein said saving unit contains information associated with a horizontal slit having one line of cell objects, and information associated with a flat surface object corresponding to said horizontal slit.

9. The multi-dimensional programming device according to claim 1, wherein said multi-dimensional horizontally written flowchart is at least one of a two-dimensional flowchart, a three-dimensional flowchart and a four-dimensional flowchart.

10. The multi-dimensional programming device according to claim 1, wherein said program flowchart symbol information includes a start terminator and an end terminator.

11. A multi-dimensional programming method, comprising the steps of: storing object information for creating a multi-dimensional horizontally written flowchart in an object file unit, reading object information from said object file unit, using said object information, editing said multi-dimensional flowchart, drafting said edited multi-dimensional horizontally written flowchart using a drafting unit, and, using a saving unit, saving said edited multi-dimensional flowchart into said object file unit, said object information including program flowchart symbol information, coordinate information, cell information and character information, said coordinate information including a combination of (i) a time axis, a data axis and a control axis, (ii) the time axis, the data axis, the control axis and a CPU axis, (iii) the time axis, the data axis, the control axis, the CPU axis and an event axis, (iv) the time axis, the data axis, the control axis, the CPU axis, the event axis and a condition axis, and (v) the time axis, the data axis, the control axis, the CPU axis, the event axis, the condition axis and a PC axis.

12. The multi-dimensional programming method according to claim 11, wherein said multi-dimensional horizontally written flowchart is at least one of a two-dimensional flowchart, a three-dimensional flowchart and a four-dimensional flowchart.

13. The multi-dimensional programming method according to claim 11, wherein said program flowchart symbol information includes a start terminator and an end terminator.

14. The multi-dimensional programming method according to claim 11, further comprising the steps of drafting a screen with the time axis, the data axis, the control axis, the CPU axis, the event axis, the condition axis and the PC axis as its coordinate information, and using a horizontal axis for the time axis and a vertical axis for the data axis, the control axis, the CPU axis, the event axis, the condition axis and the PC axis.

15. The multi-dimensional programming method according to claim 11, further comprising the step of using said object editing unit to (i) make programming space displayable on a screen by means of three-dimensional basic coordinates which use a horizontal axis for the time axis and a vertical axis for at least the data axis and the control axis, and (ii) perform editing of said screen according to an input command signal.

16. The multi-dimensional programming method according to claim 15, further comprising the step of using said object editing unit to enable dimensional switching to take a cross section of said programming space to reveal an inside portion of a program.

17. The multi-dimensional programming method according to claim 11, further comprising the step of using said object editing unit to make flat surfaces of draftable programming spaces into a group and to assign tabs to said flat surfaces in a screen construction in which the vertical axis represents the data axis, the control axis, the CPU axis, the event axis, the condition axis and the PC axis.

18. The multi-dimensional programming method according to claim 11, wherein said object editing unit includes a function for at least one of shrinking and restoring said coordinate information by units of rows and columns.

19. The multi-dimensional programming method according to claim 11, wherein said object editing unit includes a function for burying a given coordinates axis into another coordinates axis centered around the time axis throughout a programming space.

20. The multi-dimensional programming method according to claim 11, wherein said saving unit contains information associated with a horizontal slit having one line of cell objects, and information associated with a flat surface object corresponding to said horizontal slit.

* * * * *